(12) United States Patent
Shishido

(10) Patent No.: US 11,477,423 B2
(45) Date of Patent: Oct. 18, 2022

(54) METHOD FOR CONTROLLING PROJECTOR, PROJECTOR, AND DISPLAY SYSTEM

(71) Applicant: SEIKO EPSON CORPORATION, Tokyo (JP)

(72) Inventor: Yoichi Shishido, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/155,172

(22) Filed: Jan. 22, 2021

(65) Prior Publication Data

US 2021/0235050 A1     Jul. 29, 2021

(30) Foreign Application Priority Data

Jan. 24, 2020  (JP) .............................. JP2020-009797

(51) Int. Cl.
 *H04N 9/31*     (2006.01)
 *H04N 5/232*    (2006.01)

(52) U.S. Cl.
 CPC ....... *H04N 9/3188* (2013.01); *H04N 5/23229* (2013.01)

(58) Field of Classification Search
 CPC ............. H04N 9/3188; H04N 5/23229; H04N 9/3147; H04N 9/3194; H04N 9/3185; H04N 9/317; H04N 9/31; G03B 21/14; G01B 11/25; G01B 11/08; G01B 11/2513
 See application file for complete search history.

(56) References Cited

U.S. PATENT DOCUMENTS

| | | | |
|---|---|---|---|
| 3,877,776 A * | 4/1975 | Okino ...................... | G03H 1/32 359/33 |
| 5,170,193 A * | 12/1992 | McMillan .......... | G01B 11/2513 351/212 |
| 5,680,233 A * | 10/1997 | Faris ...................... | G06F 1/1626 348/E13.058 |
| 6,028,649 A * | 2/2000 | Faris ...................... | G06F 3/0412 348/E13.058 |
| 6,538,705 B1 | 3/2003 | Higurashi et al. | |
| 9,247,180 B2 * | 1/2016 | Oshima ............. | H04N 21/8358 |
| 9,613,596 B2 * | 4/2017 | Oshima ............. | H04N 21/2547 |
| 9,961,317 B2 * | 5/2018 | Morrison ............. | H04N 9/3185 |
| 2005/0231820 A1 | 10/2005 | Miyasaka | |
| 2005/0263715 A1* | 12/2005 | Nakasuji ............... | H01J 37/141 250/311 |
| 2010/0177164 A1* | 7/2010 | Zalevsky .............. | H01L 23/535 348/46 |

(Continued)

FOREIGN PATENT DOCUMENTS

JP    H09-326981 A    12/1997
JP    2005-269363 A    9/2005

(Continued)

*Primary Examiner* — Paulos M Natnael
(74) *Attorney, Agent, or Firm* — Dority & Manning, P.A.

(57) ABSTRACT

A method for controlling a projector having a projection lens and a camera includes an acquisition step of acquiring a focal distance of the projection lens, a determination step of determining a size and an interval of dots configuring a projection pattern based on the focal distance, a projection step of projecting the projection pattern by the projection lens, and capturing step of capturing the projection pattern by the camera to generate a captured image.

11 Claims, 10 Drawing Sheets

(56) References Cited

U.S. PATENT DOCUMENTS

| | | | |
|---|---|---|---|
| 2012/0182416 A1* | 7/2012 | Kawaguchi | H04N 9/3194 348/128 |
| 2014/0184914 A1* | 7/2014 | Oshima | H04N 21/41407 348/564 |
| 2015/0208050 A1 | 7/2015 | Pawlak et al. | |
| 2015/0302883 A1* | 10/2015 | Watanabe | G11B 7/005 369/275.1 |
| 2016/0086583 A1* | 3/2016 | Oshima | H04N 21/4318 345/629 |
| 2016/0223319 A1* | 8/2016 | Munro | G01S 17/88 |
| 2017/0180689 A1* | 6/2017 | Morrison | H04N 9/3194 |
| 2019/0297306 A1* | 9/2019 | Narikawa | H04N 9/3191 |

FOREIGN PATENT DOCUMENTS

| | | |
|---|---|---|
| JP | 2015-159524 A | 9/2015 |
| JP | 2019-168546 A | 10/2019 |

\* cited by examiner

FIG. 3
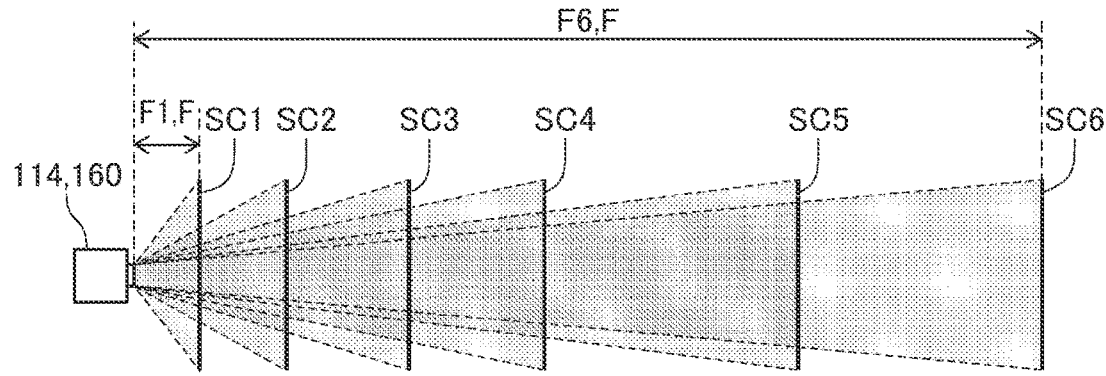
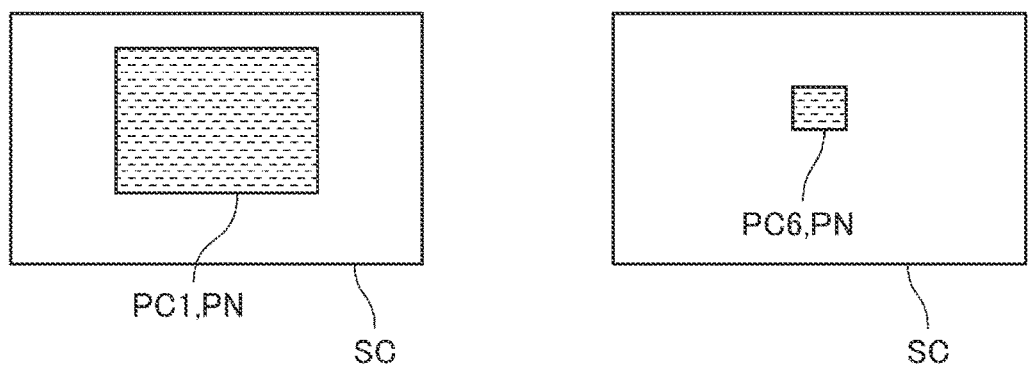
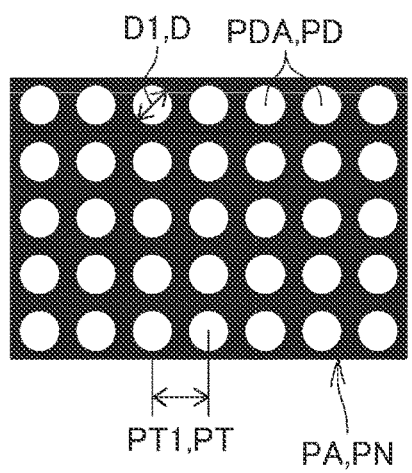
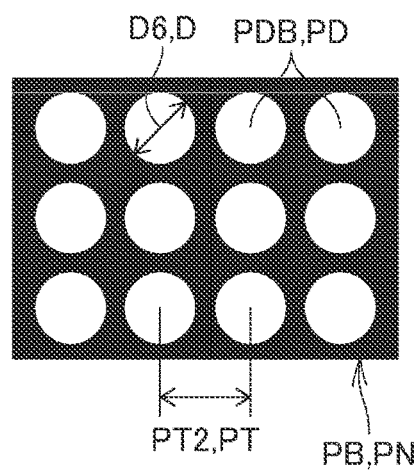

METHOD FOR CONTROLLING PROJECTOR, PROJECTOR, AND DISPLAY SYSTEM

The present application is based on, and claims priority from JP Application Serial Number 2020-009797, filed Jan. 24, 2020, the disclosure of which is hereby incorporated by reference herein in its entirety.

BACKGROUND

1. Technical Field

The present disclosure relates to a method for controlling a projector, the projector, and a display system.

2. Related Art

A technique is known in which a projector projects a dot pattern and captures a projection image in order to execute a tiling process or the like (for example, refer to JP-A-9-326981).

As being described in JP-A-9-326981, when sizes of dots configuring a dot pattern are reduced, conditions of a sampling theorem are not satisfied, and thus there is a possibility that errors occur in detection of central positions of the dots. In contrast, although it is possible to suppress the errors when interpolation is performed as an interval of the dots is small, it is necessary to reduce the sizes of the dots in order to reduce the interval of the dots.

SUMMARY

An aspect is directed to a method for controlling a projector including a projection lens and a camera, the method including acquiring focal distance of the projection lens; determining a size and an interval of dots configuring a projection pattern based on the focal distance; projecting the projection pattern by the projection lens; and capturing the projection pattern by the camera to generate a captured image.

The method for controlling the projector may further include judging whether or not the interval is equal to or smaller than a threshold; and generating a plurality of patterns as the projection pattern when it is judged that the interval is equal to or smaller than the threshold in the judging.

In the method for control controlling the projector, the plurality of patterns may include a first pattern in which the dots are disposed at a first position and a second pattern in which the dots are disposed at a second position different from the first position, and the method may further include sequentially projecting the first pattern and the second pattern.

In the method for controlling the projector, each of the first pattern and the second pattern may be configured with the dots disposed in a grid shape along two diagonal directions forming 45 degrees with a horizontal direction and separated from each other by a square root of 2 times the interval, and the second position may indicate a central position between two first positions adjacent to each other in the horizontal direction in the first pattern.

In the method for controlling the projector, the plurality of patterns may include a third pattern in which the dots are disposed at a third position, a fourth pattern in which the dots are disposed at a fourth position different from the third position, a fifth pattern in which the dots are disposed at a fifth position different from the third position and the fourth position, and a sixth pattern in which the dots are disposed at a sixth position different from the third position, the fourth position, and the fifth position, and the method may further include sequentially projecting the third pattern, the fourth pattern, the fifth pattern, and the sixth pattern.

In the method for controlling the projector, each of the third pattern, the fourth pattern, the fifth pattern, and the sixth pattern may be configured with the dots disposed in a grid shape along a horizontal direction and a vertical direction and separated from each other by two times the interval, the fourth position may indicate a position separated by the interval in each of the horizontal direction and the vertical direction from the third position, the fifth position may indicate a position separated by the interval in the vertical direction from the third position, and the sixth position may indicate a position separated by the interval in the horizontal direction from the third position.

The method for controlling projector may further include adjusting a projection position of the projection pattern based on the captured image.

Another aspect is directed to a method for controlling a projector including a projection lens and a camera, the method including: sequentially projecting, by the projection lens, a first pattern in which dots are disposed at a first position and a second pattern in which the dots are disposed at a second position different from the first position; and sequentially capturing the first pattern and the second pattern by the camera to generate a captured image.

Still another aspect is directed to a projector including an acquisition section that acquires a focal distance of a projection lens; a determination section that determines a size and an interval of dots that configure a projection pattern based on the focal distance; a projection control section that projects the projection pattern by the projection lens; and a capturing control section that captures the projection pattern by a camera to generate a captured image.

Still another aspect is directed to a display system including a projector; a camera; and a control device that is communicably coupled to the projector and the camera, in which the control device acquires a focal distance of a projection lens of the projector from the projector, and determines a size and an interval of dots which configure a projection pattern projected by the projector based on the focal distance, the projector projects the projection pattern by the projection lens, and the camera captures the projection pattern.

BRIEF DESCRIPTION OF THE DRAWINGS

FIG. 3 is a diagram showing an example of a relationship between a focal distance and a size and an interval of dots.

DESCRIPTION OF EXEMPLARY EMBODIMENTS

Hereinafter, embodiments will be described with reference to the accompanying drawings.

1. Configuration of Display System

A configuration of a display system 1 will be described with reference to FIG. 1.

The display system 1 includes a projector 100 and a personal computer 200.

The personal computer 200 is communicably coupled to the projector 100 and transmits image information to the projector 100.

The projector 100 receives the image information from the personal computer 200 and displays an image corresponding to the received image information on a screen SC.

The projector 100 is placed on, for example, a floor in front of the screen SC. The projector 100 may be installed to be suspended from a ceiling. Further, although a case where the projector 100 performs projection on the flat screen SC is illustrated in the present embodiment, a projection target is not limited to the screen SC, and a flat surface, such as a wall surface of a building, a curved surface, or an uneven surface may be used.

The personal computer 200 is coupled to the projector 100 by, for example, an HDMI (registered trademark) cable. That is, the personal computer 200 is coupled to the projector 100 so that communication is possible in conformity with a High-Definition Multimedia Interface (HDMI) standard.

2. Configuration of Projector

Figure 1:
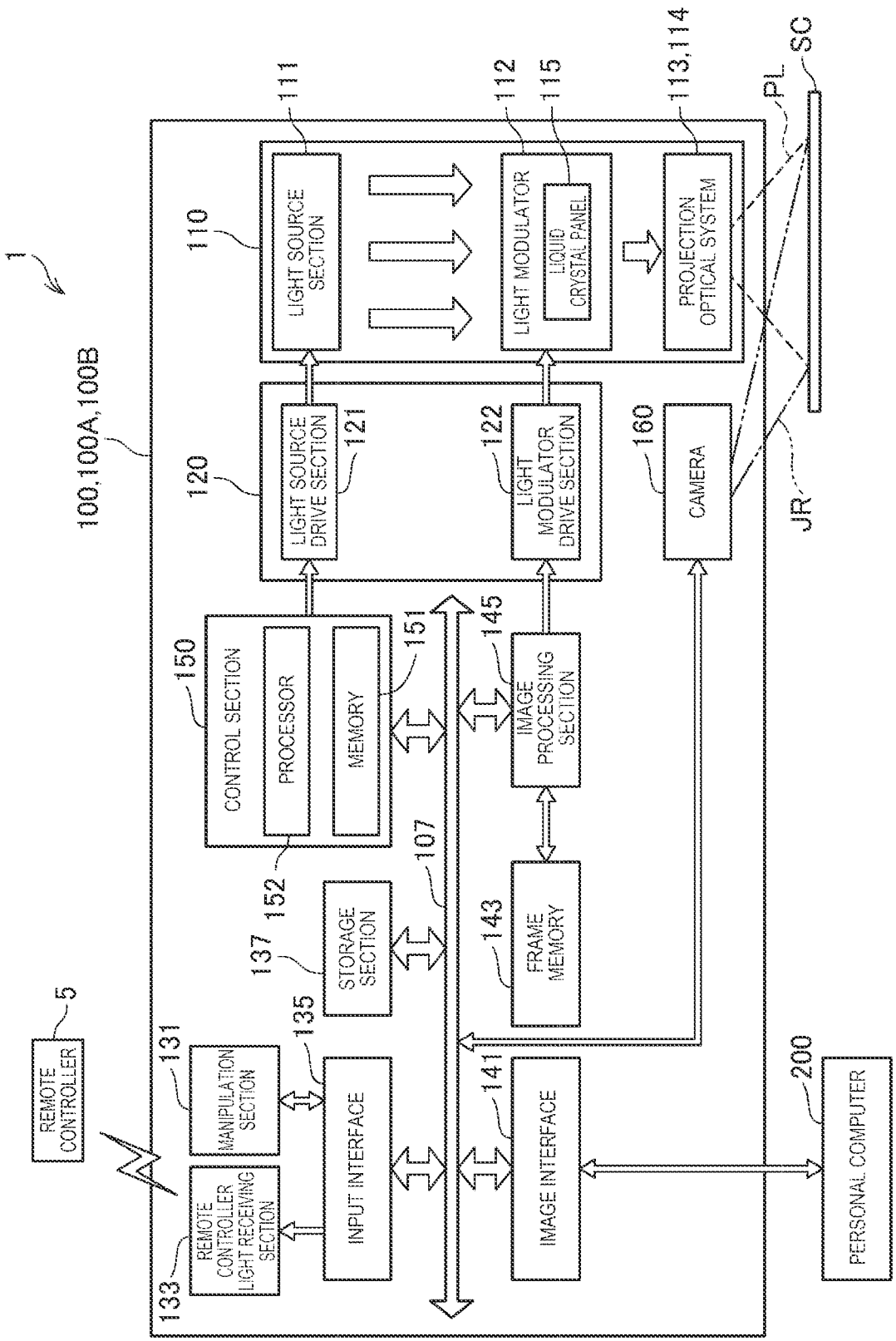
FIG. 1 is a diagram showing an example of a configuration of a projector according to a present embodiment.

FIG. 1 is a diagram showing an example of a configuration of the projector 100 according to the present embodiment.

The projector 100 includes a first projector 100A and a second projector 100B. The first projector 100A and the second projector 100B have substantially the same configuration. Therefore, in the following description, when the first projector 100A and the second projector 100B are not distinguished, there is a case where the first projector 100A and the second projector 100B are described as the projector 100.

The projector 100 includes a projection section 110 and a drive section 120 that drives the projection section 110. The projection section 110 forms an optical image and projects an image on the screen SC.

The projection section 110 includes a light source section 111, a light modulator 112, and a projection optical system 113. The drive section 120 includes a light source drive section 121 and a light modulator drive section 122. The projection section 110 is configured with an integrated circuit such as an LSI, an Application Specific Integrated Circuit (ASIC), or a Programmable Logic Device (PLD).

The light source section 111 includes a lamp, such as a halogen lamp, a xenon lamp, or an ultra-high pressure mercury lamp, or a solid-state light source such as a Light Emitting Diode (LED) or a laser light source.

Further, the light source section 111 may include a reflector that guides light emitted by the light source to the light modulator 112, and an auxiliary reflector. Furthermore, the light source section 111 may include a lens group for enhancing optical characteristics of projected light, a polarizing plate, or a dimming element for reducing the amount of light emitted by the light source on a path leading to the light modulator 112.

The light source drive section 121 is coupled to an internal bus 107, and causes the light source section 111 to turn on and off the light source according to an instruction of a control section 150 coupled to the internal bus 107 similarly.

The light modulator 112 includes, for example, three pieces of liquid crystal panels 115 corresponding to three primary colors R, G, and B. R indicates a red color, G indicates a green color, and B indicates a blue color. That is, the light modulator 112 includes the liquid crystal panel 115 corresponding to R color light, the liquid crystal panel 115 corresponding to G color light, and the liquid crystal panel 115 corresponding to B color light.

Light emitted by the light source section 111 is separated into colored lights of three colors R, G, and B to be respectively incident to the relevant liquid crystal panels 115. The three pieces of respective liquid crystal panels 115 are transmissive liquid crystal panels that modulate transmitted lights to generate image lights PL. The image lights PL modulated through the respective liquid crystal panels 115 are synthesized a synthetic optical system, such as a cross dichroic prism, and are emitted to the projection optical system 113.

In the present embodiment, a case where the light modulator 112 includes the transmissive liquid crystal panels 115 as a light modulation element is described. However, the embodiment of the present disclosure is not limited thereto. The light modulation element may be a reflective liquid crystal panel or a digital micromirror device.

The light modulator 112 is driven by the light modulator drive section 122. The light modulator drive section 122 is coupled to an image processing section 145.

Image data corresponding to each of the primary colors R, G, and B is input to the light modulator drive section 122 from the image processing section 145. The light modulator drive section 122 converts the input image data into a data signal suitable for an operation of the liquid crystal panel 115. The light modulator drive section 122 applies a voltage to each pixel of each liquid crystal panel 115 based on the data signal obtained through the conversion, and draws an image on each liquid crystal panel 115. For example, a projection pattern PN configured with dots PD is formed in a predetermined range of each liquid crystal panel 115.

The projection optical system 113 includes a lens, a mirror, and the like for forming an image of the incident image lights PL on the screen SC. The lens includes a projection lens 114. The projection lens 114 forms the image of the image lights PL on the screen SC. The projection lens 114 is detachably configured in a housing of the projector 100. In other words, the projection lens 114 is configured to be replaceable. For example, the projection lens 114 is replaced according to a distance between the projector 100 and the screen SC.

Further, the projection optical system 113 may include a zoom mechanism for enlarging or reducing the image projected on the screen SC, a focus adjustment mechanism for adjusting a focus, and the like.

The projector 100 further includes a manipulation section 131, a remote controller light receiving section 133, an input interface 135, a storage section 137, an image interface 141, a frame memory 143, the image processing section 145, the control section 150, and a camera 160. The input interface 135, the storage section 137, the image interface 141, the image processing section 145, the control section 150, and the camera 160 are coupled via the internal bus 107 so that data communication is possible to each other.

The manipulation section 131 includes various buttons and switches provided on a surface of the housing of the projector 100, generates manipulation signals corresponding to manipulations of the buttons and switches, and outputs the manipulation signals to the input interface 135. The input interface 135 outputs the manipulation signal input from the manipulation section 131 to the control section 150.

The remote controller light receiving section 133 receives infrared signals transmitted from a remote controller 5, and decodes the received infrared signals to generate the manipulation signals. The remote controller light receiving section 133 outputs the generated manipulation signals to the input interface 135. The input interface 135 outputs the manipulation signals input from the remote controller light receiving section 133 to the control section 150.

The storage section 137 is, for example, a non-volatile storage device such as a hard disk drive or a Solid State Drive (SSD). The storage section 137 stores a program executed by the control section 150, data processed by the control section 150 the image data, and the like.

The image interface 141 includes a connector and an interface circuit, and is configured so that wired coupling is possible to the personal computer 200 that supplies the image data to the projector 100. In the present embodiment, the image interface 141 is, for example, an interface for exchanging the image data and the like with the personal computer 200 in conformity with the HDMI standard. The image interface 141 is communicably coupled to the personal computer 200 via an HDMI cable.

The control section 150 includes a memory 151 and a processor 152.

The memory 151 is a storage device that non-volatilely stores a program and data executed by the processor 152. The memory 151 is configured with a magnetic storage device, a semiconductor storage element such as a flash Read Only Memory (ROM), or another type of non-volatile storage device. Further, the memory 151 may include a Random Access Memory (RAM) configuring a work area of the processor 152. The memory 151 stores data processed by the control section 150 and a control program executed by the processor 152.

The processor 152 may be configured with a single processor, or may have a configuration in which a plurality of processors function as the processor 152. The processor 152 executes the control program to control each of the sections of the projector 100. For example, the processor 152 outputs an execution instruction of an image processing corresponding to the manipulation received by the manipulation section 131 or the remote controller 5 and parameters used for the image processing to the image processing section 145. The parameters include, for example, geometric correction parameters for correcting geometric distortion of the image projected on the screen SC. Further, the processor 152 controls the light source drive section 121 to control turning on or off of the light source section 111, or adjusts brightness of the light source section 111.

It is possible to configure the image processing section 145 and the frame memory 143 with, for example, an integrated circuit. The integrated circuit includes an LSI, an ASIC, and a PLD. The PLD includes, for example, a Field-Programmable Gate Array (FPGA). Further, some of a configuration of the integrated circuit may include an analog circuit or a combination of the processor and the integrated circuit. The combination of the processor and the integrated circuit is called a microcontroller (MCU), a System-on-a-Chip (SoC), a system LSI, a chipset, or the like.

The image processing section 145 expands the image data input from the image interface 141 into the frame memory 143. The frame memory 143 includes a plurality of banks. Each of the banks has a storage capacity capable of writing the image data corresponding to one frame. The frame memory 143 is configured with, for example, a Synchronous Dynamic Random Access Memory (SDRAM).

The image processing section 145 performs, for example, the image processing, such as resolution conversion processing or resizing processing, distortion aberration correction, shape correction processing, digital zoom processing, or image hue and brightness adjustment, on the image data expanded in the frame memory 143.

Further, the image processing section 145 generates a vertical synchronization signal obtained by converting an input frame frequency of the vertical synchronization signal into a drawing frequency. The generated vertical synchronization signal is called an output synchronization signal. The image processing section 145 outputs the generated output synchronization signal to the light modulator drive section 122.

The camera 160 captures a projection image projected on the screen SC by the projection optical system 113 according to the instruction of the control section 150, and generates a captured image. The camera 160 includes an image sensor such as a Charge-Coupled Device (CCD) or a Complementary MOS (CMOS). The camera 160 outputs the generated captured image to the control section 150.

A capture range JR of the camera 160 includes the projection image projected on the screen SC. A resolution of the camera 160 corresponds to the number of images of the image sensor. The capture range JR of the camera 160 corresponds to a capture lens or the like disposed at an incident side to the image sensor.

3. Configuration of Control Section

Figure 2:
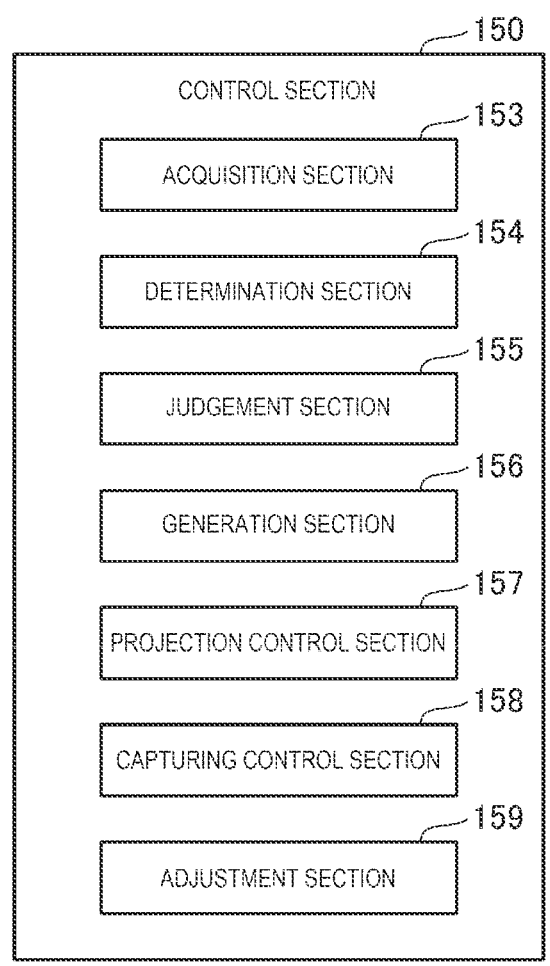
FIG. 2 is a diagram showing an example of a configuration of a control section of the projector.

FIG. 2 is a diagram showing an example of a configuration of the control section 150 of the projector 100.

As shown in FIG. 2, the control section 150 of the projector 100 includes an acquisition section 153, a determination section 154, a judgement section 155, a generation section 156, a projection control section 157, a capturing control section 158, and an adjustment section 159. Specifically, the processor 152 of the control section 150 executes the control program stored in the memory 151 to function as the acquisition section 153, the determination section 154, the judgement section 155, the generation section 156, the projection control section 157, the capturing control section 158, and the adjustment section 159.

The acquisition section 153 acquires a focal distance F of the projection lens 114 shown in FIG. 1. When the projection optical system 113 shown in FIG. 1 includes a zoom mechanism, the acquisition section 153 acquires the focal distance F of the projection optical system 113. For example, the focal distance F may be stored in advance in the projector 100 corresponding to the projection lens 114, or may be stored in advance in the projection lens 114.

The determination section 154 determines a size D and an interval PT of the dots PD configuring the projection pattern PN based on the focal distance F. The size D indicates, for example, a diameter of the dot PD. The interval PT indicates a distance between centers of the dots PD adjacent to each other.

For example, the determination section 154 determines the size D and the interval PT of the dots PD as a large value as the focal distance F is large.

A specific example of processing performed by the determination section 154 will be described with reference to FIG. 3.

The judgement section 155 judges whether or not the interval PT of the dots PD configuring the projection pattern PN is equal to or smaller than a threshold PTS based on the captured image acquired by the camera 160.

In the present embodiment, the judgement section 155 judges whether or not the interval PT of the dots PD is equal to or smaller than a first threshold PTS1. Further, the judgement section 155 judges whether or not the interval PT of the dots PD is equal to or smaller than a second threshold PTS2. The second threshold PTS2 is smaller than the first threshold PTS1. Each of the first threshold PTS1 and the second threshold PTS2 corresponds to an example of the threshold PTS.

When the judgement section 155 judges that the interval PT is equal to or smaller than the threshold, the generation section 156 generates a plurality of patterns P as the projection pattern PN.

In the present embodiment, when the judgement section 155 judges that the interval PT is equal to or smaller than the first threshold PTS1 and is not equal to or smaller than the second threshold PTS2, the generation section 156 generates a first pattern P1 and a second pattern P2 as the projection pattern PN. The first pattern P1 and the second pattern P2 correspond to an example of the plurality of patterns P.

Further, when the judgement section 155 judges that the interval PT is equal to or smaller than the second threshold PTS2, the generation section 156 generates a third pattern P3, a fourth pattern P4, a fifth pattern P5, and a sixth pattern P6 as the projection pattern PN. The third pattern P3, the fourth pattern P4, the fifth pattern P5, and the sixth pattern P6 correspond to an example of the plurality of patterns P.

Specific examples of the first pattern P1 and the second pattern P2 will be described with reference to FIG. 4. Specific examples of the third pattern P3, the fourth pattern P4, the fifth pattern P5, and the sixth pattern P6 will be described with reference to FIG. 5.

The projection control section 157 sequentially projects the plurality of patterns P generated by the generation section 156 on the screen SC.

In the present embodiment, when the generation section 156 generates the first pattern P1 and the second pattern P2, the projection control section 157 sequentially projects the first pattern P1 and the second pattern P2 on the screen SC. Further, when the generation section 156 generates the third pattern P3, the fourth pattern P4, the fifth pattern P5, and the sixth pattern P6, the projection control section 157 sequentially projects the third pattern P3, the fourth pattern P4, the fifth pattern P5, and the sixth pattern P6 on the screen SC.

The capturing control section 158 captures the projection pattern PN to generate the captured image. Specifically, the capturing control section 158 causes the camera 160 shown in FIG. 1 to capture the projection pattern PN to generate the captured image, and acquires the generated captured image from the camera 160.

In the present embodiment, when the projection control section 157 sequentially projects the first pattern P1 and the second pattern P2 on the screen SC, the capturing control section 158 sequentially generates a first image JM1 and a second image JM2. The first image JM1 indicates a captured image JM of the first pattern P1 projected on the screen SC. The second image JM2 indicates a captured image JM of the second pattern P2 projected on the screen SC.

Further, when the projection control section 157 sequentially projects the patterns from the third pattern P3 to the sixth pattern P6 on the screen SC, the capturing control section 158 sequentially generates a third image JM3, a fourth image JM4, a fifth image JM5, and a sixth image JM6. The third image JM3 indicates the captured image JM of the third pattern P3 projected on the screen SC. The fourth image JM4 indicates the captured image JM of the fourth pattern P4 projected on the screen SC. The fifth image JM5 indicates the captured image JM of the fifth pattern P5 projected on the screen SC. The sixth image JM6 indicates the captured image JM of the sixth pattern P6 projected on the screen SC.

The adjustment section 159 adjusts a projection position of the projection pattern PN based on the captured image generated by the capturing control section 158.

A specific example of a method for adjusting the projection position of the projection pattern PN will be described with reference to FIGS. 7 and 8.

In the present embodiment, the control section 150 of the projector 100 includes the acquisition section 153, the determination section 154, the judgement section 155, the generation section 156, the projection control section 157, the capturing control section 158, and the adjustment section 159. However, the embodiment of the present disclosure is not limited thereto. The control section 150 of the projector 100 or the personal computer 200 may include the acquisition section 153, the determination section 154, the judgement section 155, the generation section 156, the projection control section 157, the capturing control section 158, and the adjustment section 159. That is, the personal computer 200 may include at least one of the acquisition section 153, the determination section 154, the judgement section 155, the generation section 156, the projection control section 157, the capturing control section 153, and the adjustment section 159.

For example, the personal computer 200 may include the acquisition section 153, the determination section 154, the judgement section 155, the generation section 156, the projection control section 157, the capturing control section 158, and the adjustment section 159. In this case, the personal computer 200 corresponds to an example of a "control device".

4. Specific Example of Processing Performed by Control Section 4-1. Specific Example of Processing Performed by Determination Section FIG. 3 is a diagram showing an example of a relationship between the focal distance F and the size D and the interval PT of the dots PD. An example of processing performed by the determination section 154 will be described below with reference to FIG. 3.

An upper stage diagram of FIG. 3 is a diagram showing an example of the relationship between a position of the screen SC and the focal distance F. The projector 100 can project an image on the screen SC at a sixth position SC6 from a first position SC1 via a second position SC2, a third position SC3, a fourth position SC4, and a fifth position SC5 according to the projection lens 114. For example, when the projector 100 performs projection on the screen SC at the first position SC1, the focal distance F is set to a first focal distance F1, and, when the projector 100 performs projection on the screen SC at the sixth position SC6, the focal distance F is set to a sixth focal distance F6. In other words, when the screen SC exists at the first position SC1, the projection lens 114 whose focal distance F is the first focal distance F1 is attached, and, when the screen SC exists at the sixth position SC6, the projection lens 114 whose focal distance F is the sixth focal distance F6 is attached. The sixth focal distance F6 is larger than the first focal distance F1.

A left diagram at a middle stage of FIG. 3 shows a relationship between the screen SC and a projection image PC1 in the captured image when the screen SC is disposed at the first position SC1. A right diagram at the middle stage of FIG. 3 shows a relationship between the screen SC and a projection image PC6 in the captured image when the screen SC is disposed at the sixth position SC6. The projection image PC6 is small, compared to the projection image PC1. Each of the projection image PC1 and the projection image PC6 is, for example, the projection pattern PN.

In the present embodiment, the camera 160 is configured to be capable of capturing the entire screen SC. Here, compared to the case where the focal distance F is the first focal distance F1, a size of the projection image included in the captured image generated by the camera 160 is small when the focal distance F is the sixth focal distance F6.

A left diagram at a lower stage of FIG. 3 shows an example of a projection pattern PA projected on the screen SC disposed at the first position SC1, and a right diagram at the lower stage of FIG. 3 shows an example of a projection pattern PB projected on the screen SC disposed at the sixth position SC6. The projection pattern PA and the projection pattern PB correspond to an example of the projection pattern PN.

Dots PDA are disposed in a grid shape on the projection pattern PA, and dots PDB are disposed in the grid shape on the projection pattern PB. A size D1 indicates the size D of the dot PDA in the projection pattern PA. An interval PT1 indicates the interval PT of the dots PDA in the projection pattern PA. A size D6 indicates the size D of the dot PDB in the projection pattern PB. An interval PT2 indicates the interval PT of the dots PDB in the projection pattern PB.

The size D6 is larger than the size D1, and the interval PT2 is larger than the interval PT1.

That is, compared to a case where the focal distance F is short, when the focal distance F is long, the size of the projection pattern PN included in the captured image generated by the camera 160 is small, so that the determination section 154 determines the size D as a large value and the interval PT as a large value. On the contrary, compared to a case where the focal distance F is long, when the focal distance F is short, the size of the projection pattern PN included in the captured image generated by the camera 160 is large, so that the determination section 154 determines the size D as a small value and the interval PT as a small value.

4-2. Specific Example of Pattern Generated by Generation Section

Figure 4:
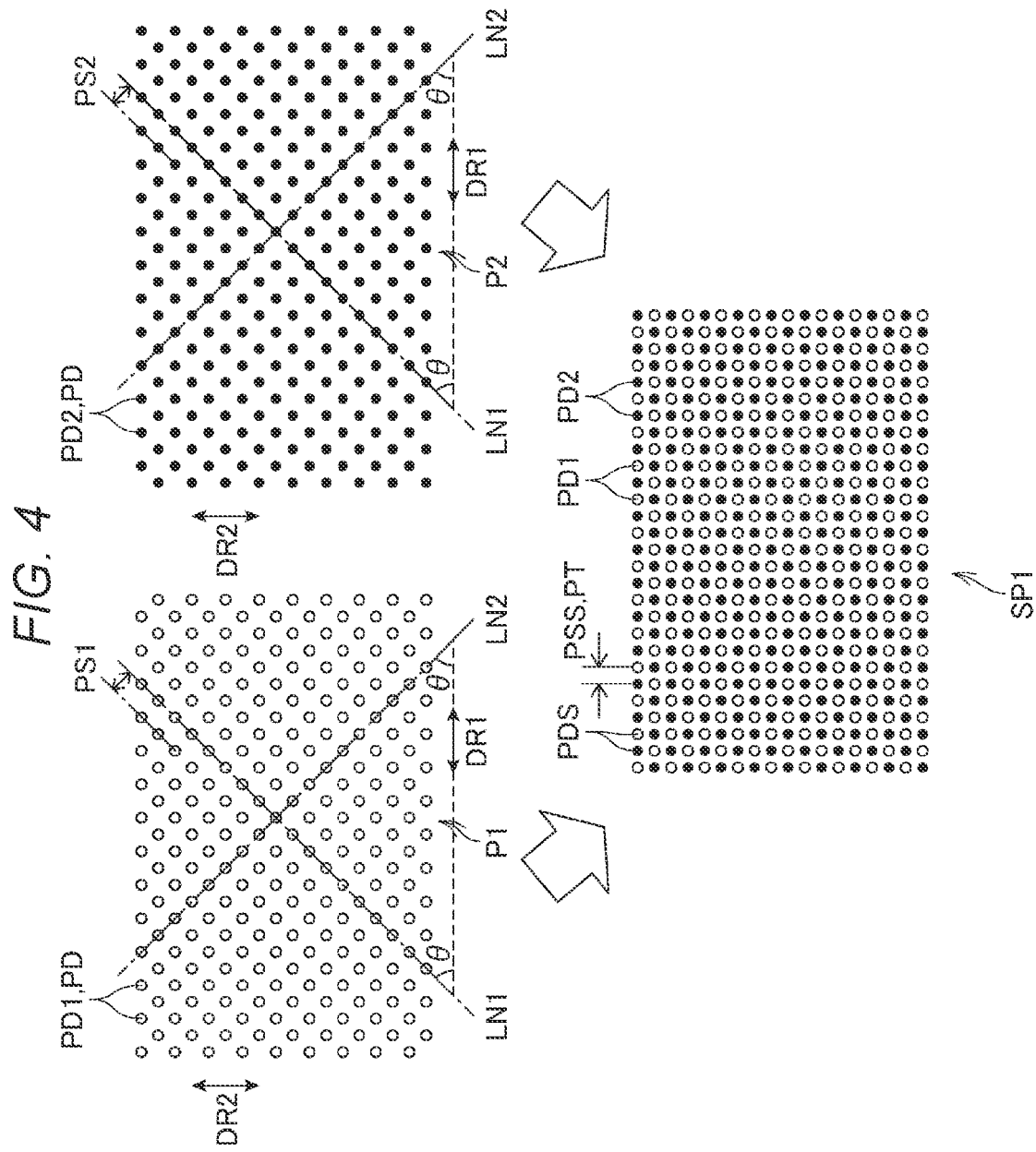
FIG. 4 is a diagram showing examples of a first pattern and a second pattern.

FIG. 4 is a diagram showing an example of the first pattern P1 and the second pattern P2.

As being described with reference to FIG. 3, when the judgement section 155 judges that the interval PT is equal to or smaller than the first threshold PTS1 and the interval PT is not equal to or smaller than the second threshold PTS2, the generation section 156 generates the first pattern P1 and the second pattern P2 as the projection pattern PN.

The first pattern P1 is shown at an upper left portion of FIG. 4, and the second pattern P2 is shown at an upper right portion of FIG. 4. In the first pattern P1, first dots PD1 are disposed at the first position, and, in the second pattern P2, second dots PD2 are disposed at the second position different from the first position.

For example, each of the first pattern P1 and the second pattern P2 is disposed in the grid shape along two diagonal directions LN1 and LN2 each forming 45 degrees with a horizontal direction DR1. Specifically, each of the first dots PD1 configuring the first pattern P1 and the second dots PD2 configuring the second pattern P2 are disposed in the grid shape along the two diagonal directions LN1 and LN2 each forming 45 degrees with the horizontal direction DR1.

Further, the first pattern P1 is configured with the first dots PD1 separated from each other by an interval PS1, and the second pattern P2 is configured with the second dots PD2 separated from each other by an interval PS2. The horizontal direction DR1 is orthogonal to a vertical direction DR2.

Further, the second position indicates a central position between two first positions adjacent to each other in the horizontal direction in the first pattern P1. That is, the second dot PD2 is disposed at the central position between the two first dots PD1 adjacent to each other in the horizontal direction in the first pattern P1.

Each of the interval PS1 and the interval PS2 indicates an interval of a square root of 2 times the interval PT. Further, each of the sizes of the first dots PD1 and the second dots PD2 is the same as the size D. The interval PT and the size D are determined the determination section 154 shown in FIG. 2.

In FIG. 4, in order to distinguish between the first dots PD1 and the second dots PD2, the first dots PD1 are represented by white circles and the second dots PD2 are represented by black circles for convenience. The first dots PD1 are dots that configure the first pattern P1, and the second dots PD2 are dots that configure the second pattern P2. That is, each of the first dots PD1 and the second dots PD2 is a circular region having high brightness, compared to a surrounding region. Further, colors of the first dots PD1 are, for example, red, and colors of the second dots PD2 are, for example, blue. The colors of the first dots PD1 and the colors of the second dots PD2 may be the same.

A lower portion of FIG. 4 shows a synthetic pattern SP1. The synthetic pattern SP1 shows a pattern which the first pattern P1 and the second pattern P2 are synthesized. The synthetic pattern SP1 is configured with dots PDS. The dots PDS include the first dots PD1 and the second dots PD2.

An interval PSS of the dots PDS is the same as the interval PT.

The projection control section 157 shown in FIG. 2 sequentially projects the first pattern P1 and the second pattern P2 on the screen SC, and the capturing control section 158 sequentially generates the captured image of each of the first pattern P1 and the second pattern P2 projected on the screen SC, and thus it is possible to specify positions of the dots PDS configuring the synthetic pattern SP1 on the screen SC. That is, it is possible to specify the positions of the dots PDS on the screen SC when the dots PDS having the size D and the interval PT determined by the determination section 154 are disposed in the grid shape.

Figure 5:
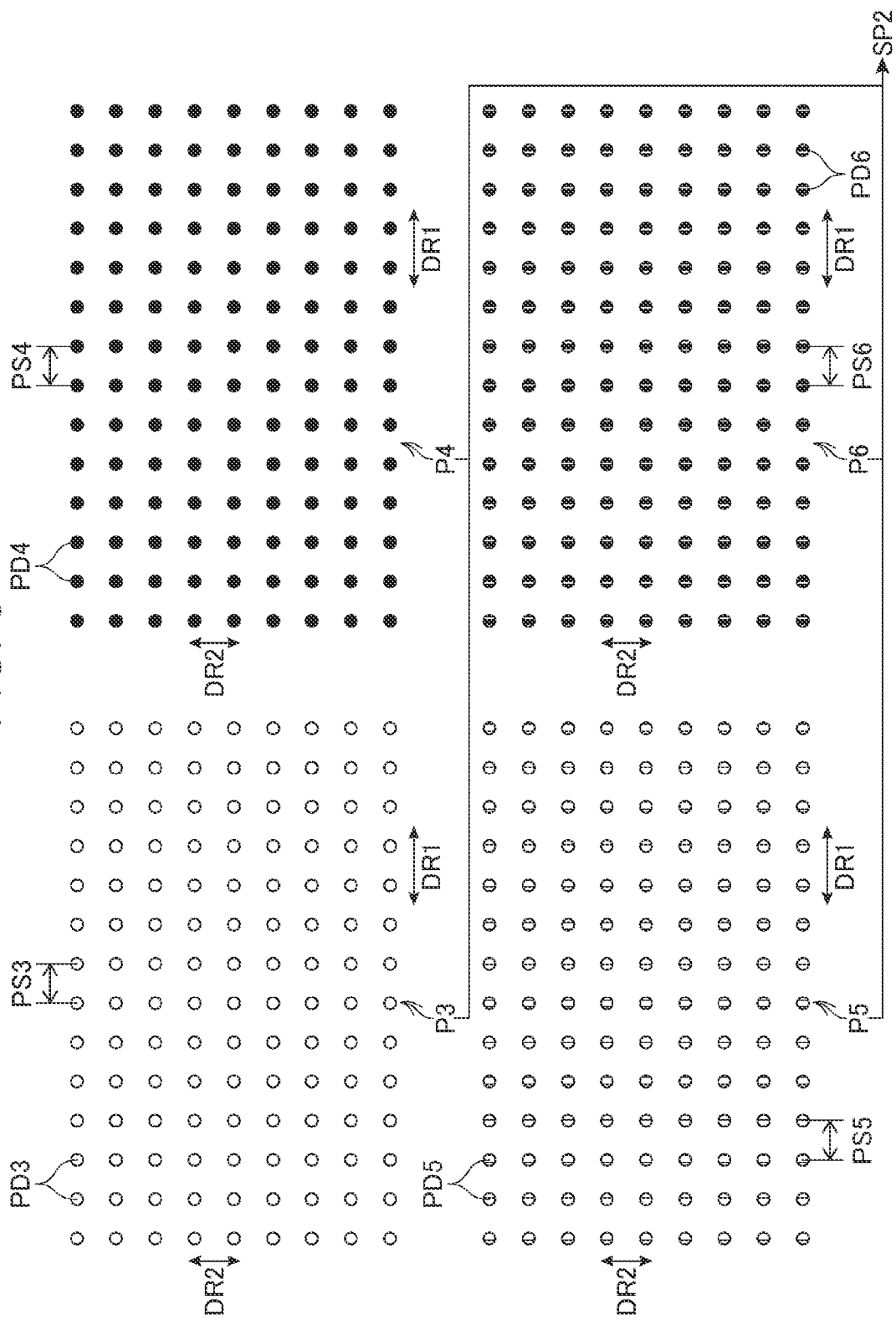
FIG. 5 is a diagram showing examples of patterns from a third pattern to a sixth pattern.

FIG. 5 is a diagram showing examples of the patterns from the third pattern P3 to the sixth pattern P6.

As being described with reference to FIG. 2, when the judgement section 155 judges that the interval PT is equal to or smaller than the second threshold PTS2, the generation section 156 generates the patterns from the third pattern P3 to the sixth pattern P6 as the projection pattern PN.

The third pattern P3 is shown at an upper left portion of FIG. 5, the fourth pattern P4 is shown at an upper right portion of FIG. 4, the fifth pattern P5 is shown at a lower left portion of FIG. 5, and the sixth pattern P6 is shown at a lower right portion of FIG. 4.

In the third pattern P3, third dots PD3 are disposed at a third position, and, in the fourth pattern P4, fourth dots PD4 are disposed at a fourth position different from the third position. Further, in the fifth pattern P5, fifth dots PD5 are disposed at a fifth position different from the third position and the fourth position, and, in the sixth pattern P6, sixth dots PD6 are disposed at a sixth position which is different from the third position, the fourth position, and the fifth position.

The third pattern P3 is disposed in the grid shape along the horizontal direction DR1 and the vertical direction DR2. Specifically, the third dots PD3 configuring the third pattern P3 are disposed in the grid shape along the horizontal direction DR1 and the vertical direction DR2. Further, the third pattern P3 is configured with the third dots PD3 separated from each other by an interval PS3.

The fourth pattern P4 is disposed in the grid shape along the horizontal direction DR1 and the vertical direction DR2. Specifically, the fourth dots PD4 configuring the fourth pattern P4 are disposed in the grid shape along the horizontal direction DR1 and the vertical direction DR2. Further, the fourth pattern P4 configured with the fourth dots PD4 separated from each other by an interval PS4. The fourth position in which the fourth dots PD4 are disposed indicates a position separated by the interval PT in each of the horizontal direction DR1 and the vertical direction DR2 from the third position in which the third dots PD3 are disposed.

The fifth pattern P5 is disposed in the grid shape along the horizontal direction DR1 and the vertical direction DR2. Specifically, the fifth dots PD5 configuring the fifth pattern P5 are disposed in the grid shape along the horizontal direction DR1 and the vertical direction DR2. Further, the fifth pattern P5 is configured with the fifth dots PD5 separated from each other by an interval PS5. The fifth position in which the fifth dots PD5 are disposed indicates a position separated by the interval PT in the vertical direction DR2 from the third position in which the third dots PD3 are disposed.

The sixth pattern P6 is disposed in the grid shape along the horizontal direction DR1 and the vertical direction DR2. Specifically, the sixth dots PD6 configuring the sixth pattern P6 are disposed in the grid shape along the horizontal direction DR1 and the vertical direction DR2. Further, the sixth pattern P6 is configured with the sixth dots PD6 separated from each other by an interval PS6. The sixth position in which the sixth dots PD6 are disposed indicates a position separated by the interval PT in the horizontal direction DR1 from the third position in which the third dots PD3 are disposed.

Each of the interval PS3, the interval PS4, the interval PS5, and the interval PS6 indicates an interval twice the interval PT. Further, each of the sizes of the third dots PD3, the fourth dots PD4, the fifth dots PD5, and the sixth dots PD6 is the same as the size D. The interval PT and the size D are determined by the determination section 154.

In FIG. 5, in order to distinguish between the third dots PD3, the fourth dots PD4, the fifth dots PD5, and the sixth dots PD6, the third dots PD3 are represented by white circles, the fourth dots PD4 are represented by black circles, the fifth dots PD5 are represented by circles with light hatching, and the sixth dots PD6 are represented by circles with dark hatching for convenience.

The third dots PD3 are dots that configure the third pattern P3, the fourth dots PD4 are dots that configure the fourth pattern P4, the fifth dots PD5 are dots that configure the fifth pattern P5, and the sixth dots PD6 are dots that configure the sixth pattern P6. That is, each of the third dots PD3, the fourth dots PD4, the fifth dots PD5, and the sixth dots PD6 is the circular region having high brightness, compared to the surrounding region. Further, the colors of the third dots PD3 are, for example, red, the colors of the fourth dots PD4 are, for example, blue, the colors of the fifth dots PD5 are, for example, yellow, and the colors of the sixth dots PD6 are, for example, green. The colors of the third dots PD3, the colors of the fourth dots PD4, the colors of the fifth dots PD5, and the colors of the sixth dots PD6 may be the same as each other.

Figure 6:
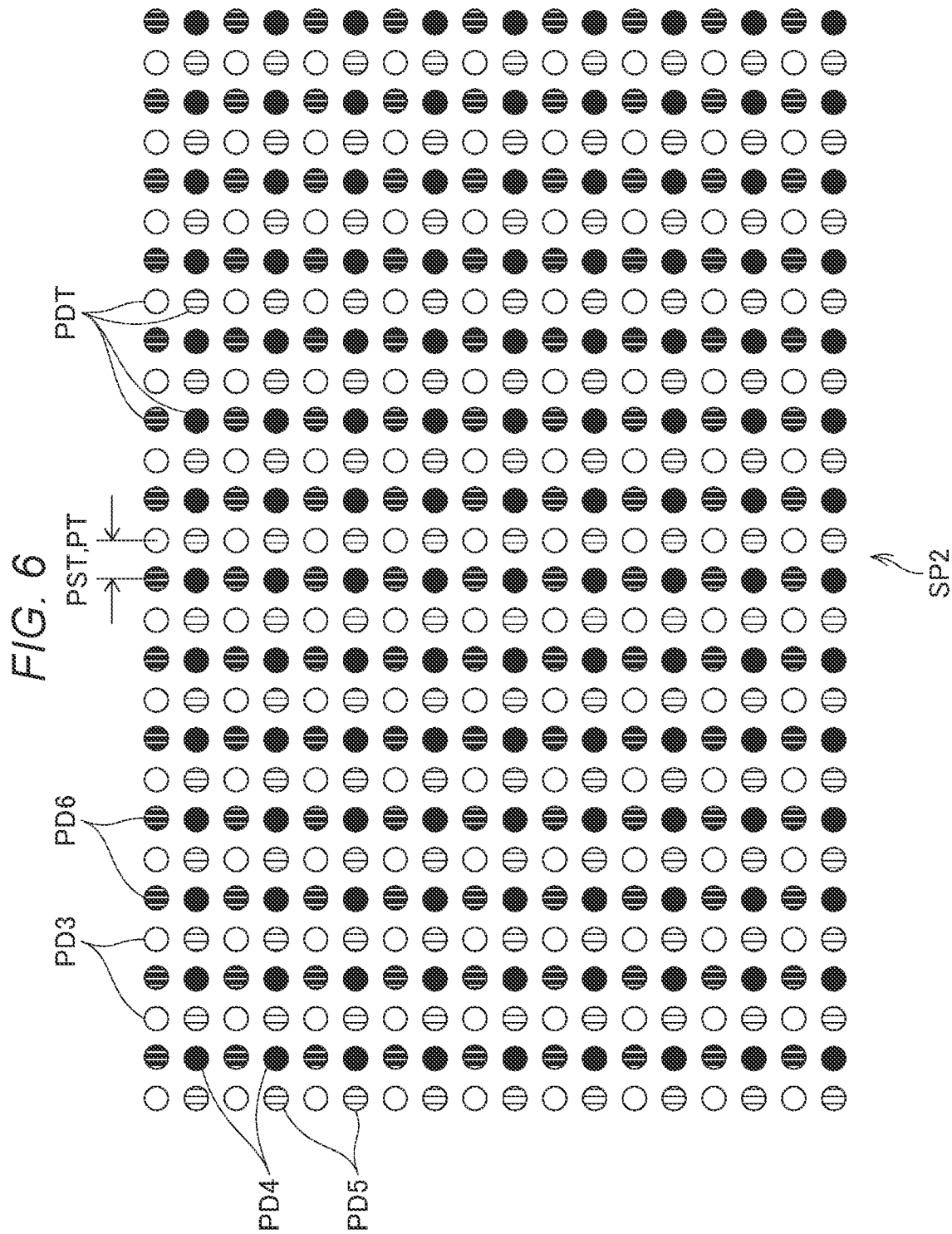
FIG. 6 is a diagram showing a synthetic pattern from the third pattern to the sixth pattern.

FIG. 6 shows a synthetic pattern SP2. The synthetic pattern SP2 shows a pattern in which the third pattern P3, the fourth pattern P4, the fifth pattern P5, and the sixth pattern P6 are synthesized. The synthetic pattern SP2 is configured with dots PDT. The dots PDT include the third dots PD3, the fourth dots PD4, the fifth dots PD5, and the sixth dots PD6.

An interval PST of the dots PDT is the same as the interval PT.

The projection control section 157 shown in FIG. 2 sequentially projects the third pattern P3, the fourth pattern P4, the fifth pattern P5, and the sixth pattern P6 on the screen SC, and the capturing control section 158 sequentially generates each of the captured images of the patterns from the third pattern P3 to the sixth pattern P6 which are projected on the screen SC. Therefore, it is possible to specify the positions of the dots PDT configuring the synthetic pattern SP2 on the screen SC. That is, it is possible to specify the positions of the dots PDT on the screen SC when the dots PDT having the size D and the interval PT determined by the determination section 154 are disposed in the grid shape.

4-3. Specific Example of Method for Calculating Central Position of Dot

Figure 7:
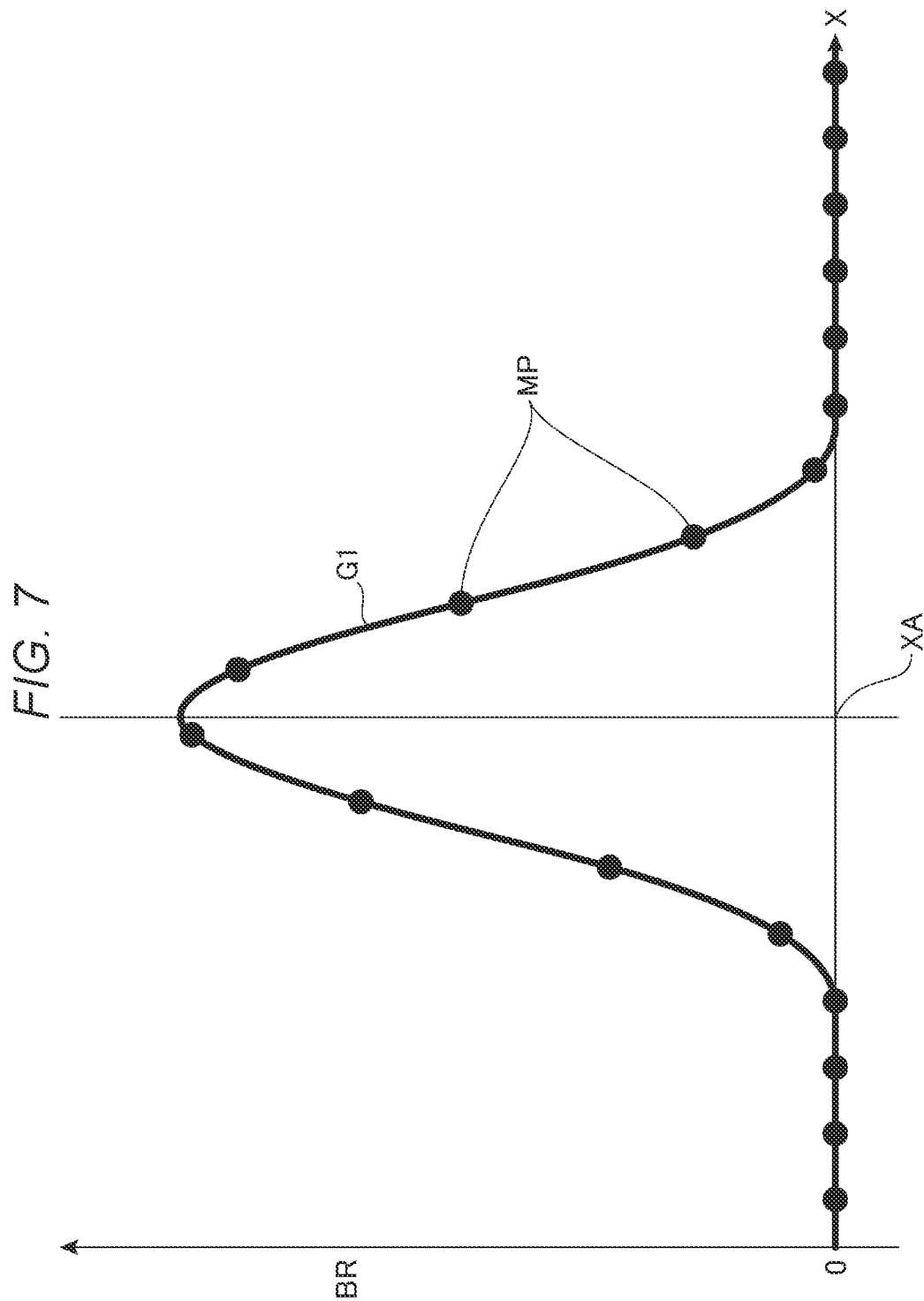
FIG. 7 is a graph showing an example of a method for detecting a central position of the dot.

FIG. 7 is a graph showing an example of a method for detecting a central position of the dot PD.

A horizontal axis of FIG. 7 is an X axis, and a vertical axis indicates a brightness value BR of a pixel. For example, the X axis indicates a position of the pixel in the horizontal direction DR1. A measurement point MP indicates an X coordinate and the brightness value BR for each pixel of the captured image captured by the camera 160.

A graph G1 shows an approximate curve which passes through the measurement point MP. The approximate curve is, for example, a spline curve. Processing for calculating the approximate curve corresponds to processing for interpolating the measurement point MP.

The adjustment section 159 shown in FIG. 2 calculates an X coordinate XA corresponding to the central position of the dot PD in the X axis direction based on the graph G1. For example, the X coordinate at which the brightness value BR is a maximum value in the graph G1 is calculated as the X coordinate XA corresponding to the central position.

Although the method for calculating the central position of the dot PD in the X axis direction is described with reference to FIG. 7, the adjustment section 159 calculates the central position of the dot PD in a Y axis direction in the same manner. A Y axis indicates, for example, a position of the pixel in the vertical direction DR2. In this way, the adjustment section 159 can specify the central position of the dot PD.

4-4. Specific Example of Method for Adjusting Projection Position

Figure 8:
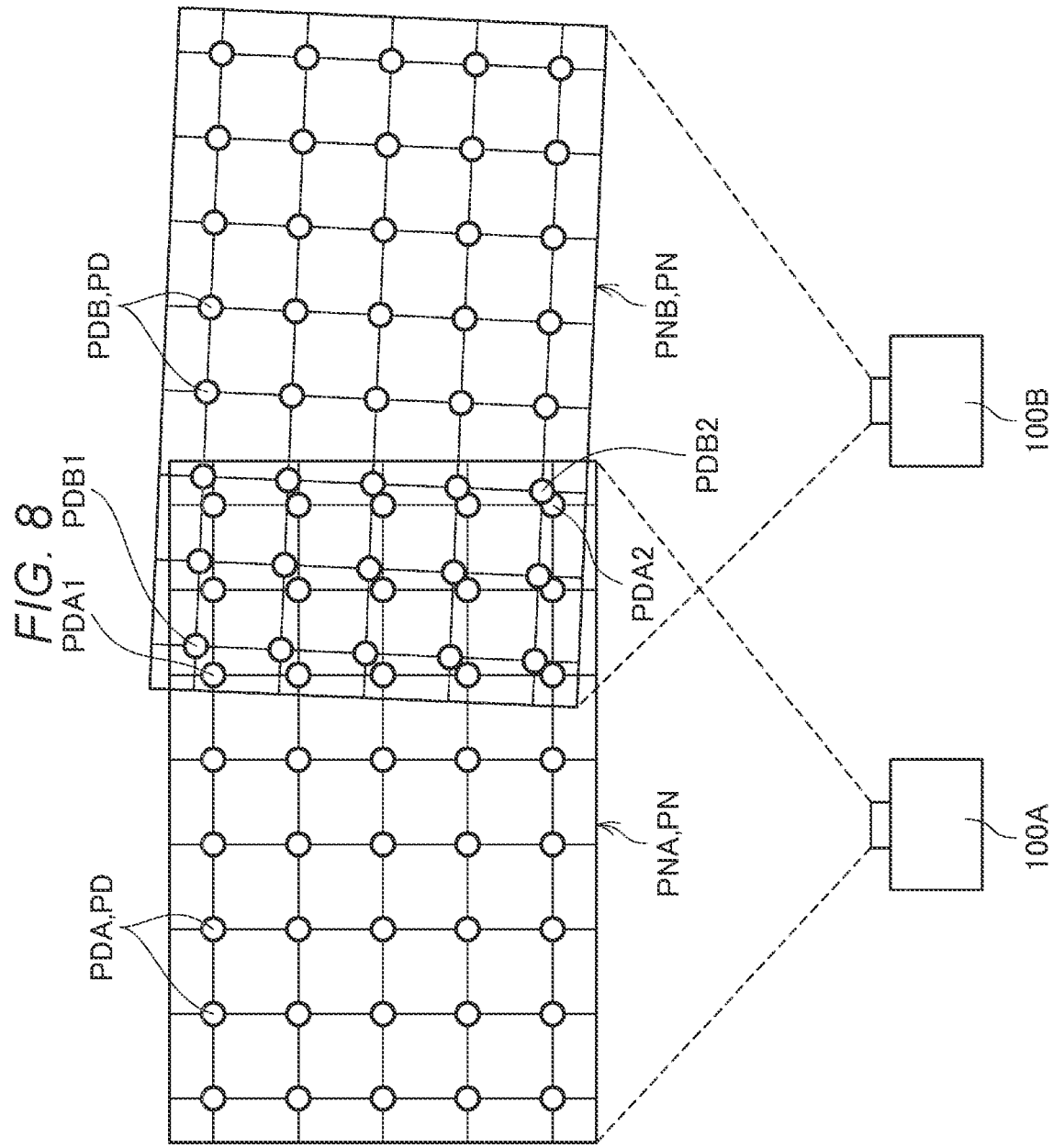
FIG. 8 is a diagram showing an example of a method for adjusting a projection position.

FIG. 8 is a diagram showing an example of a method for adjusting the projection position. FIG. 8 describes the method for adjusting the projection position when a tiling process is performed on the projection image projected from the first projector 100A and the projection image projected from the second projector 100B.

The projection control section 157 of the first projector 100A projects a projection pattern PNA on the screen SC, and the projection control section 157 of the second projector 100B projects a projection pattern PNB on the screen SC. Each of the projection pattern PNA and the projection pattern PNB corresponds to an example of the projection pattern PN.

The projection pattern PNA is configured with the dots PDA disposed in the grid shape, and the projection pattern PNB is configured with the dots PDB disposed in the grid shape. The dot PDA and the dot PDB correspond to an example of the dot PD.

The capturing control section 158 of the first projector 100A captures the projection pattern PNA to generate the captured image. The capturing control section 158 of the second projector 100B captures the projection pattern PNB to generate the captured image.

As shown in FIG. 8, a left end section of the projection pattern PNB overlaps a right end section of the projection pattern PNA. Here, the captured image generated by the capturing control section 158 of the second projector 100B includes an image of the right end section of the projection pattern PNA.

Further, a dot PDB1 disposed at the left end section of the projection pattern PNB corresponds to a dot PDA1 disposed at the right end section of the projection pattern PNA, and a dot PDB2 disposed at the left end section of the projection pattern PNB corresponds to a dot PDA2 disposed at the right end section of the projection pattern PNA. Here, the adjustment section 159 of the second projector 100B calculates, for example, each of the central positions of the dot PDA1, the dot PDB1, the dot PDA2, and the dot PDB2, and performs projection conversion on the central position of the dot PDB1 and the central position of the dot PDA1, performs the projection conversion on the central of the dot PDB2 and the central position of the dot PDA2, and adjusts a projection position of the projection pattern PNB.

In this way, it is possible to adjust the projection position of the projection pattern PNB.

Although the case where the projection position of the projection pattern PNB is adjusted is described with reference to FIG. 8, at least one of the projection positions of the projection pattern PNA and the projection pattern PNB may be adjusted. For example, the projection position of the projection pattern PNA may be adjusted.

In the present embodiment, the case where the tiling process is performed on the projection image projected from the first projector 100A and the projection image projected from the second projector 100B is described. However, the embodiment of the present disclosure is not limited thereto. The tiling process may be performed on the projection images projected from each of the plurality of projectors 100. For example, the tiling process may be performed on the projection image projected from each of the three projectors 100 or the tiling process may be performed on the projection image projected from each of the four projectors 100.

5. Processing Performed by Control Section

Figure 9:
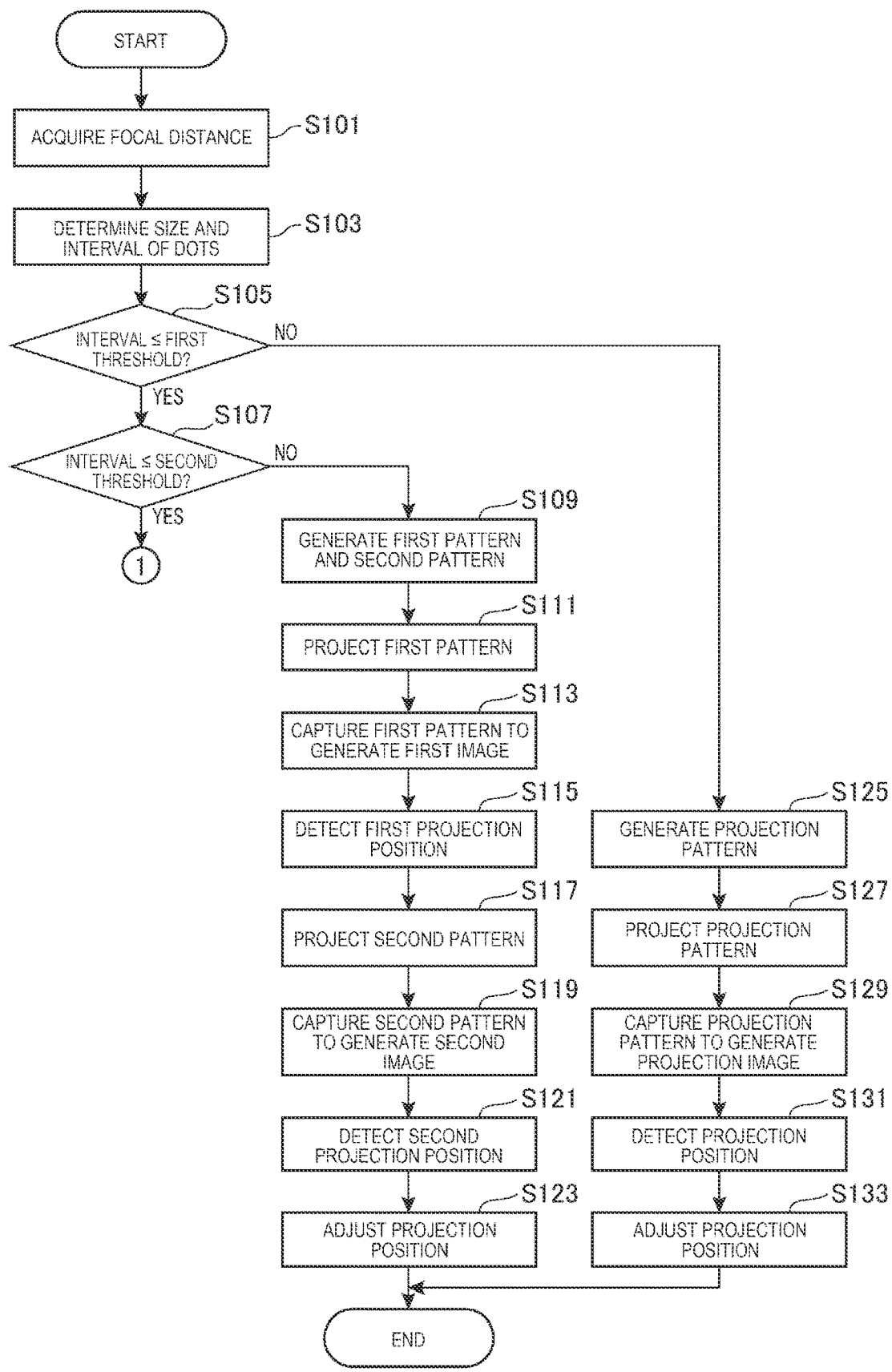
FIG. 9 is a flowchart showing an example of processing performed by the control section.
Figure 10:
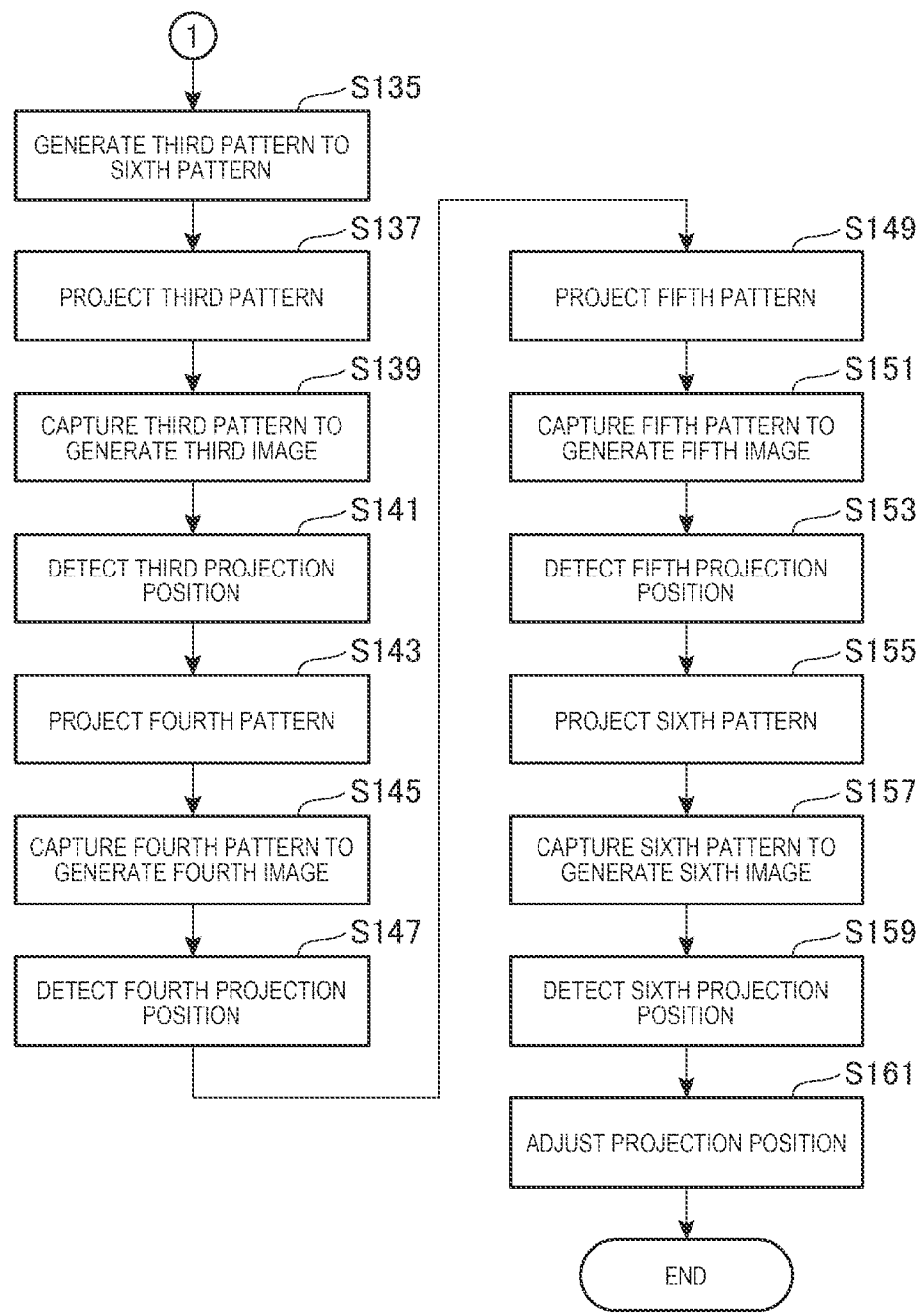
FIG. 10 is a flowchart showing an example of the processing performed by the control section.

Next, a specific example of processing performed by the control section 150 will be described with reference to FIGS. 9 and 10. FIGS. 9 and 10 are flowcharts showing an example of the processing performed by the control section 150.

First, as shown in FIG. 9, in step S101, the acquisition section 153 acquires the focal distance F of the projection lens 114.

Next, in step S103, the determination section 154 determines the size D and the interval PT of the dots PD configuring the projection pattern PN based on the focal distance F.

Next, in step S105, the judgement section 155 judges whether or not the interval PT of the dots PD configuring the projection pattern PN is equal to or smaller than the first threshold PTS1.

When the judgement section 155 judges that the interval PT is not equal to or smaller than the first threshold PTS1 (step S105; NO), the process proceeds to step S125. When the judgement section 155 judges that the interval PT is equal to or smaller than the first threshold PTS1 (step S105; YES), the process proceeds to step S107.

Furthermore, in step S107, the judgement section 155 judges whether or not the interval PT of the dots PD configuring the projection pattern PN is equal to or smaller than the second threshold PTS2.

When the judgement section 155 judges that the interval PT is equal to or smaller than the second threshold PTS2 (step S107; YES), the process proceeds to step S135 shown in FIG. 10. When the judgement section 155 judges that the interval PT is not equal to or smaller than the second threshold PTS2 (step S107; NO), the process proceeds to step S109.

Next, in step S109, the generation section 156 generates the first pattern P1 and the second pattern P2 as the projection pattern PN.

Next, in step S111, the projection control section 157 projects the first pattern P1 on the screen SC.

Next, in step S113, the capturing control section 158 captures the first pattern P1 projected on the screen SC and generates the first image JM1.

Next, step S115, the adjustment section 159 detects a first projection position PP1 based on the first image JM1. The first projection position PP1 indicates a projection position of the first dots PD1 configuring the first pattern P1.

Next, in step S117, the projection control section 157 projects the second pattern P2 on the screen SC.

Next, in step S119, the capturing control section 158 captures the second pattern P2 projected on the screen SC, and generates the second image JM2.

Next, in step S121, the adjustment section 159 detects a second projection position PP2 based on the second image JM2. The second projection position PP2 indicates a projection position of the second dots PD2 configuring the second pattern P2.

Next, in step S123, the adjustment section 159 adjusts the projection position of the projection pattern PN based on the first projection position PP1 and the second projection position PP2. Specifically, the adjustment section 159 adjusts projection positions of the first pattern P1 and the second pattern P2. Thereafter, the process ends.

When the judgement section 155 judges that the interval PT is not equal to or smaller than the first threshold PTS1 (step S105; NO), the generation section 156 generates the projection pattern PN in step S125.

Next, in step S127, the projection control section 157 projects the projection pattern PN on the screen SC.

Next, in step S129, the capturing control section 158 captures the projection pattern PN projected on the screen SC, and generates the captured image JM.

Next, in step S131, the adjustment section 159 detects a projection position PP based on the captured image JM. The projection position PP indicates a projection position of the dots PD configuring the projection pattern PN.

Next, in step S133, the adjustment section 159 adjusts the projection position of the projection pattern PN based on the projection position PP. Thereafter, the process ends.

When the judgement section 155 judges that the interval PT is equal to or smaller than the second threshold PTS2 (step S107; YES), the generation section 156 generates the patterns from the third pattern P3 to the sixth pattern P6 in step S135 shown in FIG. 10.

Next, in step S137, the projection control section 157 projects the third pattern P3 on the screen SC.

Next, in step S139, the capturing control section 158 captures the third pattern P3 projected on the screen SC and generates the third image JM3.

Next, in step S141, the adjustment section 159 detects a third projection position PP3 based on the third image JM3. The third projection position PP3 indicates a projection position of the third dots PD3 configuring the third pattern P3.

Next, in step S143, the projection control section 157 projects the fourth pattern P4 on the screen SC.

Next, in step S145, the capturing control section 158 captures the fourth pattern P4 projected on the screen SC, and generates the fourth image JM4.

Next, in step S147, the adjustment section 159 detects a fourth projection position PP4 based on the fourth image JM4. The fourth projection position PP4 indicates a projection position of the fourth dots PD4 configuring the fourth pattern P4.

Next, in step S149, the projection control section 157 projects the fifth pattern P5 on the screen SC.

Next, in step S151, the capturing control section 158 captures the fifth pattern P5 projected on the screen SC, and generates the fifth image JM5.

Next, in step S153, the adjustment section 159 detects a fifth projection position PP5 based on the fifth image JM5. The fifth projection position PP5 indicates a projection position of the fifth dots PD5 configuring the fifth pattern P5.

Next, in step S155, the projection control section 157 projects the sixth pattern P6 on the screen SC.

Next, in step S157, the capturing control section 158 captures the sixth pattern P6 projected on the screen SC, and generates the sixth image JM6.

Next, in step S159, the adjustment section 159 detects a sixth projection position PP6 based on the sixth image JM6. The sixth projection position PP6 indicates a projection position of the sixth dots PD6 configuring the sixth pattern P6.

Next, in step S161, the adjustment section 159 adjusts the projection position of the projection pattern PN based on the projection positions from the third projection position PP3 to the sixth projection position PP6. Specifically, the adjustment section 159 adjusts the projection positions from the third pattern P3 to the sixth pattern P6. Thereafter, the process ends.

Step S101 corresponds to an example of an "acquisition step". Step S103 corresponds to an example of a "determination step". Step S105 and step S107 correspond to an example of a "judgement step". Step S109 and step S135 correspond to an example of a "generation step". Step S111, step S117, step S137, step S143, step S149 and step S155 correspond to an example of a "projection step". Step S113, step S119, step S139, step S145, step S151 and step S157 correspond to an example of a "capturing step". Step S123 and step S161 correspond to an example of an "adjustment step".

6. Present Embodiment and Effects

Hereinabove, as being described with reference to from FIG. 1 to FIG. 10, a method for controlling the projector 100 according to the present embodiment is a method for controlling the projector including the projection lens 114 and the camera 160, and includes the acquisition step of acquiring the focal distance F of the projection lens 114, the determination step of determining the size D and the interval PT of the dots PD configuring the projection pattern PN based on the focal distance F, the projection step of projecting the projection pattern PN by the projection lens 114, and the capturing step of capturing the projection pattern PN by the camera 160 to generate the captured image JM.

Accordingly, since the size D and the interval PT of the dots PD configuring the projection pattern PN are determined based on the focal distance F of the projection lens 114, it is possible to determine the size D and the interval PT of the dots PD to appropriate values. Therefore, it is possible to improve detection accuracy of the central positions of the dots PD and to suppress errors when interpolation is performed.

Further, the method for controlling the projector 100 according to the present embodiment includes the judgement step of judging whether or not the interval PT is equal to or smaller than the threshold PTS, and the generation step of generating the plurality of patterns P as the projection pattern PN when it is judged that the interval PT is equal to or smaller than the threshold PTS in the judgement step.

Accordingly, when it is judged that the interval PT is equal to or smaller than the threshold PTS, the plurality of patterns P are generated as the projection pattern PN. Therefore, even when the interval PT is equal to or smaller than the threshold PTS, it is possible to set the size D of the dot PD to a predetermined value or larger. The predetermined value indicates, for example, a lower limit value of the size D of the dot PD in which it is possible to secure the detection accuracy of the central position of the dot PD. Therefore, it is possible to improve the detection accuracy of the central positions of the dots PD and to suppress the errors when interpolation is performed.

Further, in the method for controlling the projector 100 according to the present embodiment, the plurality of patterns P include the first pattern P1 in which the dots PD are disposed in the first position, and the second pattern P2 in which the dots PD are disposed in the second position different from the first position, and the method includes the projection step of sequentially projecting the first pattern P1 and the second pattern P2.

Accordingly, since the first pattern P1 in which the dots PD are disposed at the first position and the second pattern P2 in which the dots PD are disposed at the second position different from the first position are sequentially projected, it is possible to appropriately project the dots PD whose size D is equal to or larger than the predetermined value even when the interval PT is equal to or smaller than the threshold PTS. The predetermined value indicates, for example, a lower limit value of the size D of the dot PD in which it is possible to secure the detection accuracy of the central position of the dot PD. Therefore, it is possible to improve the detection accuracy of the central positions of the dots PD and to suppress the errors when interpolation is performed.

Further, in the method for controlling the projector 100 according to the present embodiment, each of the first pattern P1 and the second pattern P2 is configured with the dots PD disposed in the grid shape along two diagonal directions LN1 and LN2 forming 45 degrees with the horizontal direction DR1 and separated from each other by a square root of 2 times the interval PT. The second position indicates a central position between two first positions adjacent to each other in the horizontal direction DR1 in the first pattern P1.

Accordingly, as shown in the synthetic pattern SP1 of FIG. 4, it is possible to specify the position of the dots PDS disposed in the grid shape at an equivalent interval on the screen SC. Therefore, even when the interval PT is equal to or smaller than the threshold PTS, it is possible to appropriately project the dots PD whose size D is equal to or larger than the predetermined value. The predetermined value indicates, for example, a lower limit value of the size D of the dot PD in which it is possible to secure the detection accuracy of the central position or the dot PD. As a result, it is possible to improve detection accuracy of the central positions of the dots PD and to suppress errors when interpolation is performed.

Further, in the method for controlling the projector 100 according to the present embodiment, the plurality of patterns P includes the third pattern P3 in which the dots PD are disposed at the third position, the fourth pattern P4 in which the dots PD are disposed at the fourth position different from the third position, the fifth pattern P5 in which the dots PD are disposed at the fifth position different from the third position and the fourth position, and the sixth pattern P6 in which the dots PD are disposed at the sixth position different from the third position, the fourth position, and the fifth position, and the method includes the projection step of sequentially projecting the third pattern P3, the fourth pattern P4, the fifth pattern P5, and the sixth pattern P6.

That is, since the patterns are sequentially projected from the third pattern P3 to the sixth pattern P6, in which the dots PD whose positions are different from each other are disposed, it is possible to appropriately project the dots PD whose size P is equal to or larger than the predetermined value even when the interval PT is equal to or smaller than the threshold PTS. The predetermined value indicates, for example, a lower limit value of the size D of the dot PD in which it is possible to secure the detection accuracy of the central position of the dot PD. Therefore, it is possible to improve the detection accuracy of the central positions of the dots PD and to suppress the errors when interpolation is performed.

Further, in the method for controlling the projector 100 according to the present embodiment, each of the third pattern P3, the fourth pattern P4, the fifth pattern P5, and the sixth pattern P6 is configured with the dots PD that are disposed in the grid shape along the horizontal direction DR1 and the vertical direction DR2 and separated from each other by twice the interval PT. The fourth position indicates a position separated by the interval PT in each of the horizontal direction DR1 and the vertical direction DR2 from the third position. The fifth position indicates a position separated by the interval PT in the vertical direction DR2 from the third position, and the sixth position indicates a position separated by the interval PT in the horizontal direction DR1 from the third position.

Accordingly, as shown in the synthetic pattern SP2 of FIG. 6, it is possible to specify the positions of the dots PDT disposed in the grid shape at an equivalent interval of the interval PT on the screen SC. Therefore, even when the interval PT is equal to or smaller than the threshold PTS, it is possible to appropriately project the dots PD whose size D is equal to or larger than the predetermined value. The predetermined value indicates, for example, a lower limit value of the size D of the dot PD in which it is possible to secure the detection accuracy of the central position of the dot PD. As a result, it is possible to improve detection accuracy of the central positions of the dots PD and to suppress errors when interpolation is performed.

Further, the method for controlling the projector 100 according to the present embodiment includes the adjustment step of adjusting the projection position of the projection pattern PN based on the captured image JM.

Therefore, since the projection position of the projection pattern PN is adjusted based on the captured image JM generated by capturing the projection pattern PN, it is possible to appropriately adjust the projection position of the projection pattern PN even when the interval PT is equal to or smaller than the threshold PTS.

Further, the method for controlling the projector 100 according to the present embodiment is a method for controlling a projector including the projection lens 114 and the camera 160, and includes the projection step of sequentially projecting, by the projection lens 114, the first pattern P1 in which the dots PD are disposed at the first position and the second pattern P2 in which the dots PD are disposed at the second position different from the first position, and the capturing step of sequentially capturing the first pattern P1 and the second pattern P2 by the camera 160 to generate the captured image JM.

Accordingly, the first pattern P1 in which the dots PD are disposed at the first position and the second pattern P2 in which the dots PD are disposed at the second position different from the first position are sequentially projected, and thus, for example, it is possible to appropriately project the dots PD whose size D is equal to or larger than the predetermined value even when the interval PT is equal to or smaller than the threshold PTS. The predetermined value indicates, for example, a lower limit value of the size D of the dot PD in which it is possible to secure the detection accuracy of the central position of the dot PD. Therefore, it is possible to improve the detection accuracy of the central positions of the dots PD and to suppress the errors when interpolation is performed.

Further, the projector 100 according to the present embodiment includes the acquisition section 153 that acquires the focal distance F of the projection lens 114, the determination section 154 that determines the size D and the interval PT of the dots PD that configure the projection pattern PN based on the focal distance F, the projection control section 157 that causes the projection lens 114 to project the projection pattern PN, and the capturing control section 158 that causes the camera 160 to capture the projection pattern PN to generate the captured image JM.

Accordingly, since the size D and the interval PT of the dots PD configuring the projection pattern PN are determined based on the focal distance F of the projection lens 114, it is possible to determine the size D and the interval PT of the dots PD to appropriate values. Therefore, it is possible to improve the detection accuracy of the central positions of the dots PD and to suppress the errors when interpolation is performed.

Further, the display system 1 according to the present embodiment is a display system including the projector 100, the camera 160, and the personal computer 200 communicably coupled to the projector 100 and the camera 160, in which the personal computer 200 acquires the focal distance F of the projection lens 114 of the projector 100 from the projector 100, determines the size D and the interval PT of the dots PD configuring the projection pattern PN projected by the projector 100 based on the focal distance F, the projector 100 projects the projection pattern PN by the projection lens 114, and the camera 160 captures the projection pattern PN.

Accordingly, since the size D and the interval PT of the dots PD configuring the projection pattern PN are determined based on the focal distance F of the projection lens 114, it is possible to determine the size D and the interval PT of the dots PD to appropriate values. Therefore, it is possible to improve the detection accuracy of the central positions of the dots PD and to suppress the errors when interpolation is performed.

7. Other Embodiments

The above-described embodiment is a preferred embodiment. However, the present disclosure is not limited to the above-described embodiment, and various modifications are possible within a scope without deviating from the gist.

In the present embodiment, although the case where the "control device" is the personal computer 200 is described, the embodiment of the present disclosure is not limited thereto. The "control device" may be communicably coupled to the projector 100. The "control device" may be, for example, a tablet terminal, a smartphone, or the like.

Further, in the present embodiment, the judgement section 155 judges whether or not the interval PT of the dots PD is equal to or smaller than the first threshold PTS1 and whether or not the interval PT of the dots PD is equal to or smaller than the second threshold PTS2. However, the embodiment of the present disclosure is not limited thereto. The judgement section 155 may judge whether or not the interval PT of the dots PD is equal to or smaller than the threshold PTS.

Further, in the present embodiment, the generation section 156 generates the patterns from the first pattern P1 to the sixth pattern P6. However, the embodiment of the present disclosure is not limited thereto. The generation section 156 may generate at least one of the patterns, that is, from the first pattern P1 to the second pattern P2 and from the third pattern P3 to the sixth pattern P6.

Further, each of the functional sections shown in FIGS. 1 and 2 represents a functional configuration, and does not particularly limit a specific mounting form. That is, it is not always necessary to mount hardware individually corresponding to each functional section, and a configuration is also possible in which the functions of the plurality of functional sections are realized by executing programs by one processor. Further, some of the functions realized by the software in the embodiment may be realized by the hardware, or some of the functions real zed by the hardware may be realized by the software. In addition, it is possible to randomly change a specific detailed configuration of each of the other sections of the projector 100 without deviating from the gist.

Further, processing sections of the flowcharts shown in FIGS. 9 and 10 are acquired through division according to main processing contents for easy understanding of the processing performed by the control section 150. The present disclosure is not limited by a method or a name of the division performed on the processing sections shown in the flowcharts of FIGS. 9 and 10, and division into a further large number of processing sections can be performed according to the processing contents, and division can be performed so that one processing section further includes a large number of processing. Further, a processing order of the flowchart is not limited to the illustrated example.

Further, it is possible to realize the method for controlling the projector 100 by causing the processor 152 included in the projector 100 to execute a control program corresponding to the method for controlling the projector 100. It is possible to record the control program in a computer-readable recording medium. It is possible to use a magnetic or optical recording medium or a semiconductor memory device as the recording medium. Specifically, a portable or fixed recording medium, such as a flexible disk, a HDD, a Compact Disk Read Only Memory (CD-ROM), a DVD, a Blu-ray (registered trademark) Disc, a magneto-optical disk, a flash memory, or a card-type recording medium, can be exemplified. Further, the recording medium may be a non-volatile storage device, such as a RAM, a ROM, or an HDD, which is an internal storage device included in the image processing device. Further, it is possible to realize the method for controlling the projector 100 by storing the control program corresponding to the method for controlling the projector 100 in a server device or the like and downloading the control program from the server device to the projector 100.

What is claimed is:

1. A method for controlling a projector including a projection lens and a camera, the method comprising:
   acquiring a focal distance of the projection lens;
   determining a size and an interval of dots based on the focal distance of the projection lens;
   generating a projection pattern including the dots;
   projecting the projection pattern by the projection lens;
   capturing the projection pattern by the camera to generate a captured image;
   judging whether or not the interval is equal to or smaller than a threshold; and
   generating a plurality of patterns as the projection pattern when it is judged that the interval is equal to or smaller than the threshold;
   wherein the plurality of patterns include a first pattern in which the dots are disposed at a first position and a second pattern in which the dots are disposed at a second position different from the first position, and
   the method further comprises sequentially projecting the first pattern and the second pattern.

2. The method according to claim 1, wherein
   each of the first pattern and the second pattern is configured with the dots disposed in a grid shape along two diagonal directions forming 45 degrees with a horizontal direction and separated from each other by a square root of 2 times the interval, and
   the second position indicates a central position between two first positions adjacent to each other in the horizontal direction in the first pattern.

3. The method according to claim 1, wherein
   the plurality of patterns include a third pattern in which the dots are disposed at a third position, a fourth pattern in which the dots are disposed at a fourth position different from the third position, a fifth pattern in which the dots are disposed at a fifth position different from the third position and the fourth position, and a sixth pattern in which the dots are disposed at a sixth position different from the third position, the fourth position, and the fifth position, and the method further comprises sequentially projecting the third pattern, the fourth pattern, the fifth pattern, and the sixth pattern.

4. The method according to claim 3, wherein each of the third pattern, the fourth pattern, the fifth pattern, and the sixth pattern is configured with the dots disposed in a grid shape along a horizontal direction and a vertical direction and separated from each other by two times the interval, the fourth position indicates a position separated by the interval in each at the horizontal direction and the vertical direction from the third position, the fifth position indicates a position separated by the interval in the vertical direction from the third position, and the sixth position indicates a position separated by the interval in the horizontal direction from the third position.

5. The method according to claim 1, further comprising: adjusting a projection position of the projection pattern based on the captured image.

6. A projector comprising one or more processors programmed to acquire a focal distance of a projection lens, to determine a size and an interval of dots based on the focal distance of the projection lens, to generate a projection pattern including the dots, to project the projection pattern by the projection lens, to capture the projection pattern by a camera to generate a captured image, to judge whether or not the interval is equal to or smaller than a threshold, and to generate a plurality of patterns as the projection pattern when it is judged that the interval is equal to or smaller than the threshold;

wherein the plurality of patterns include a first pattern in which the dots are disposed at a first position and a second pattern in which the dots are disposed at a second position different from the first position, and the one or more processors are further programmed to sequentially project the first pattern and the second pattern.

7. The projector according to claim 6, wherein the plurality of patterns include a third pattern in which the dots are disposed at a third position, a fourth pattern in which the dots are disposed at a fourth position different from the third position, a fifth pattern in which the dots are disposed at a fifth position different from the third position and the fourth position, and a sixth pattern in which the dots are disposed at a sixth position different from the third position, the fourth position, and the fifth position, and the one or more processors are further programmed to sequentially project the third pattern, the fourth pattern, the fifth pattern, and the sixth pattern.

8. The projector according to claim 7, wherein each of the third pattern, the fourth pattern, the fifth pattern, and the sixth pattern is configured with the dots disposed in a grid shape along a horizontal direction and a vertical direction and separated from each other by two times the interval, the fourth position indicates a position separated by the interval in each at the horizontal direction and the vertical direction from the third position, the fifth position indicates a position separated by the interval the vertical direction from the third position, and the sixth position indicates a position separated by the interval in the horizontal direction from the third position.

9. A display system comprising:

a projector having a projection lens;

a camera; and one or more processors, a control device that is communicably coupled to the projector and the camera, wherein the control device and programmed to:

acquire a focal distance of a projection lens of the projector from the projector, and determine a size and an interval of dots which configure a projection pattern projected by the projector based on the focal distance of the projection lens, generate a projection pattern including the dots, control the projector to project the projection pattern by the projection lens, control the camera to capture the projection pattern, judge whether or not the interval is equal to or smaller than a threshold, and generate a plurality of patterns as the projection pattern when it is judged that the interval is equal to or smaller than the threshold;

wherein the plurality of patterns include a first pattern in which the dots are disposed at a first position and a second pattern in which the dots are disposed at a second position different from the first position, and the one or more processors are further programmed to sequentially project the first pattern and the second pattern.

10. The display system according to claim 9, wherein the plurality of patterns include a third pattern in which the dots are disposed at a third position, a fourth pattern in which the dots are disposed at a fourth position different from the third position, a fifth pattern in which the dots are disposed at a fifth position different from the third position and the fourth position, and a sixth pattern in which the dots are disposed at a sixth position different from the third position, the fourth position, and the fifth position, and the one or more processors are further programmed to sequentially project the third pattern, the fourth pattern, the fifth pattern, and the sixth pattern.

11. The display system according to claim 10, wherein each of the third pattern, the fourth pattern, the fifth pattern, and the sixth pattern is configured with the dots disposed in a grid shape along a horizontal direction and a vertical direction and separated from each other by two times the interval, the fourth position indicates a position separated by the interval in each at the horizontal direction and the vertical direction from the third position, the fifth position indicates a position separated by the interval in the vertical direction from the third position, and the sixth position indicates a position separated by the interval in the horizontal direction from the third position.

* * * * *